Aug. 18, 1931.    W. G. MILLER    1,819,914
TRANSMISSION CHOCK FOR AUTOMOBILES
Filed March 25, 1929    2 Sheets-Sheet 1
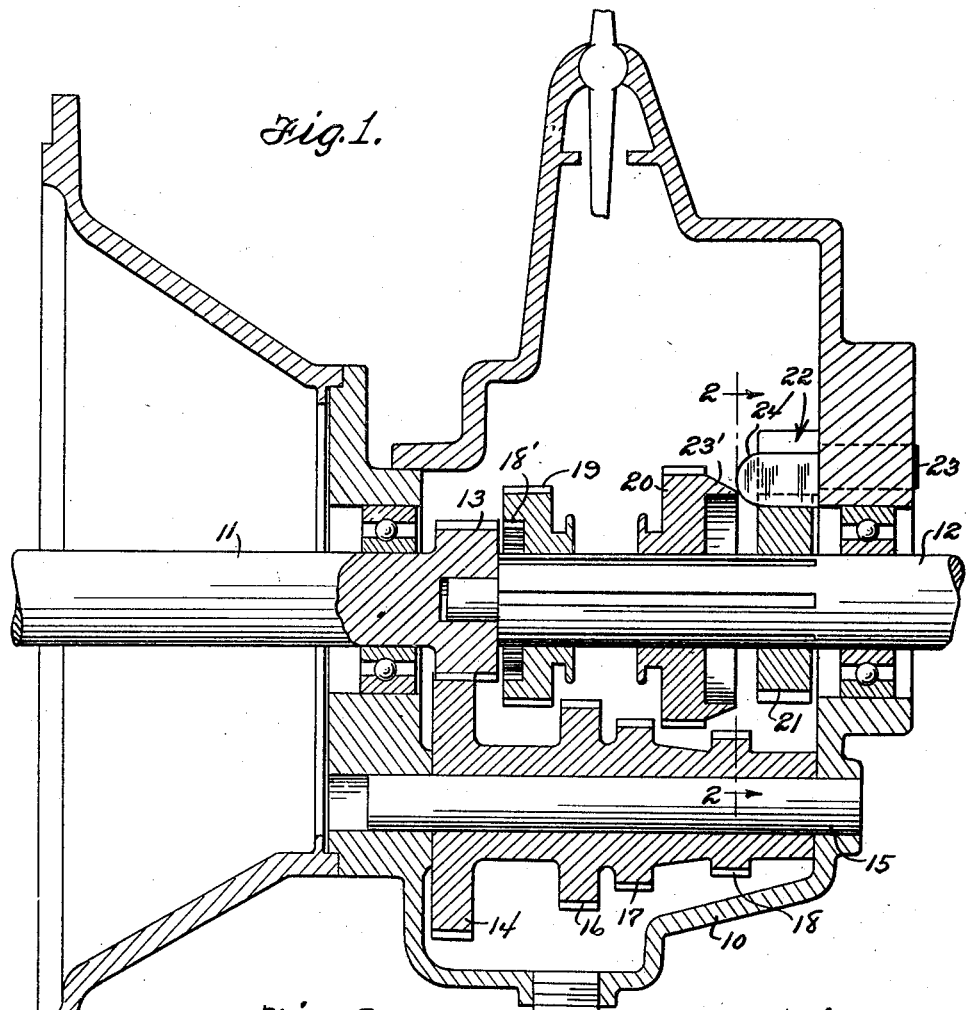
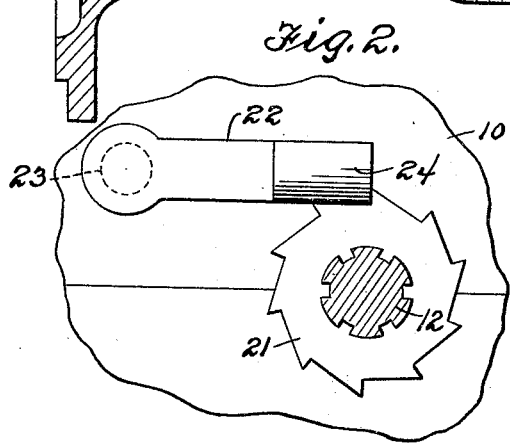
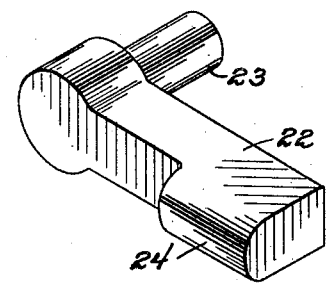
William Gordon Miller
INVENTOR
BY Victor J. Evans
ATTORNEY Aug. 18, 1931.   W. G. MILLER   1,819,914
TRANSMISSION CHOCK FOR AUTOMOBILES
Filed March 25, 1929   2 Sheets-Sheet 2
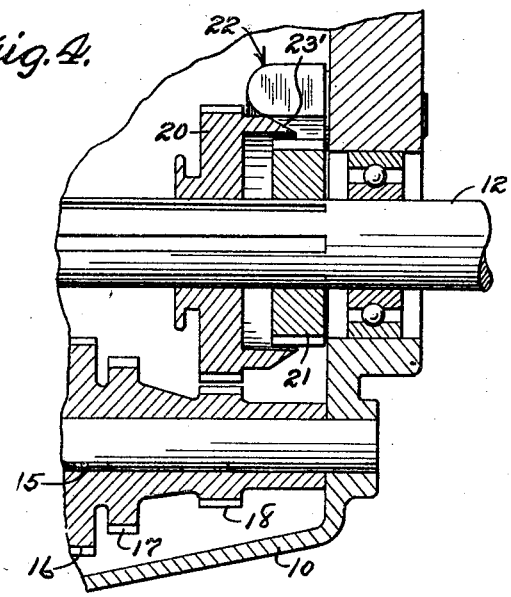
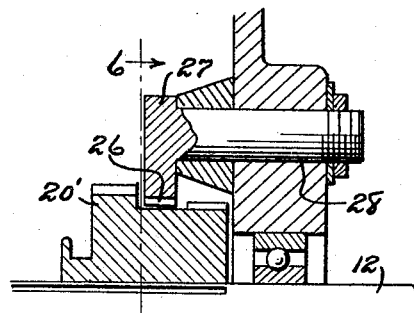
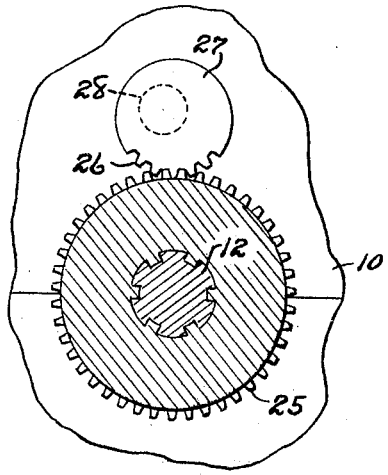
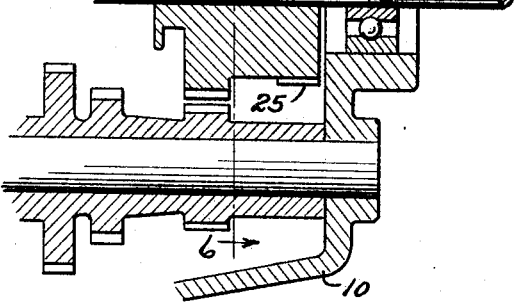
William Gordon Miller
INVENTOR
BY Victor J. Evans
ATTORNEY Patented Aug. 18, 1931

1,819,914

UNITED STATES PATENT OFFICE

WILLIAM GORDON MILLER, OF BELLEVUE, PENNSYLVANIA

TRANSMISSION CHECK FOR AUTOMOBILES

Application filed March 25, 1929. Serial No. 349,836.

This invention relates to transmission mechanisms for automobiles and has for an object the provision of means to prevent rearward drifting or rolling movement of the automobile as the latter is being put into gear upon an up grade.

Most motorists experience considerable difficulty when attempting to start from a standing position upon an up grade. The automobile must be held either by the foot brake or the hand brake and the gas must be fed and the clutch let in and all of these operations must be performed carefully to avoid stalling the engine.

The present invention overcomes this disadvantage by providing means for preventing rearward movement of the automobile except when the transmission mechanism is engaged in reverse gear, means being provided for automatically releasing the driving shaft of the automobile as the reverse gearing is engaged and for automatically locking said driving shaft against reverse rotation when the reverse gears are disengaged and the transmission mechanism either in forward driving position or in neutral.

With the above and other objects in view, the invention further includes the following novel features and details of construction, to be hereinafter more fully described, illustrated in the accompanying drawings and pointed out in the appended claims.

In the drawings:—

Figure 1 is a sectional view illustrating a transmission mechanism with the invention applied.

Figure 2 is a section on the line 2—2 of Figure 1.

Figure 3 is a detail perspective view of the holding dog.

Figure 4 is a fragmentary perspective view showing the driven shaft released.

Figure 5 is a fragmentary sectional view showing a slightly different form of the invention.

Figure 6 is a section on the line 6—6 of Figure 5.

Referring to the drawings in detail wherein like characters of reference denote corresponding parts, the reference character 10 indicates a transmission housing within which the transmission gearing is contained. Extending into this housing is one end of a drive shaft 11 which forms a part of or is connected to the drive shaft of the engine of the automobile, while the reference character 12 indicates the driven shaft which is connected with the differential mechanism in the usual manner.

Mounted upon the end of the drive shaft 11 is a gear 13 which engages and drives an idler gear 14 mounted upon a countershaft 15. Also mounted upon the countershaft 15 is an intermediate speed gear 16, a low speed gear 17 and a reverse gear 18.

Slidingly mounted upon the driven shaft is an internal gear 18' which is adapted to engage the gear 13 to provide a high speed connection between the shafts 11 and 12, while surrounding the gear 18' is a gear 19 which is adapted to be engaged with the intermediate speed gear 16. Also slidingly mounted upon the shaft 12 is a gear 20 which may be engaged with the gear 17 or it may be positioned to drive the gear 18 through an idler gear (not shown) in the usual manner so as to drive the shaft 12 in a reverse direction from the direction of rotation of the shaft 11.

Also mounted upon the shaft 12 is a ratchet wheel 21 which is adapted to be engaged by a dog 22 mounted for pivotal movement as shown at 23 in the housing 10. This dog normally engages the ratchet wheel 21 and the teeth of this wheel are so disposed as to prevent rotation of the shaft 12 in a direction reverse to the direction of rotation of the shaft 11. However, when the gear 20 is shifted so that the shaft 12 will be driven through the countershaft 15 and the gear 18, the annular transversely wedge-shaped flange 23' which extends laterally from one side of the gear 20 will engage the rounded projection 24 upon the free end of the dog so as to lift this dog from engagement with the teeth of the ratchet wheel 21 and permit reverse rotation of the shaft 12.

The gearing with the exception of the annulus 23, the ratchet wheel 21 and dog 22 is of the usual or any suitable type of automobile transmission gearing, parts being omitted to more clearly illustrate the invention.

In the form of the invention shown in Figures 5 and 6, the reverse gear 20' carries a gear 25. The teeth of this last mentioned gear are adapted to engage teeth 26 provided upon the periphery of an eccentric 27, the latter being pivotally mounted upon a pin 28 carried by the housing 10.

When the reverse gear 20' is in the position shown in Figure 5 of the drawings to drive the shaft 12 in a direction reverse from the direction of rotation of the shaft 11, the teeth of the gear 25 will be disengaged from the teeth of the eccentric 27. When however, the reverse gear 20' is disengaged, the gear 20' will engage the teeth of the eccentric 27 and any tendency of the shaft 12 to rotate in a reverse direction will be resisted by the binding action between the eccentric and the gear 25.

The invention is susceptible of various changes in its form, proportions and minor details of construction and the right is herein reserved to make such changes as properly fall within the scope of the appended claim.

Having described the invention what is claimed is:—

In combination with a transmission mechanism of an automobile including a drive shaft and a driven shaft, and forward speed gearing and reverse gearing, means to selectively adjust the gearing to engage either the forward or reverse gears, a ratchet wheel carried by the driven shaft, a pawl cooperating with said wheel to lock the shaft against reverse movement, said pawl including a pivot pin projecting from one longitudinal edge and adjacent one end thereof and journaled in the adjacent wall of the transmission casing, said pawl having a rounded longitudinal edge portion adjacent its opposite end, and means carried by the reverse gearing to cooperate with the rounded edge portion of the pawl to release the driven shaft when the reverse gears are engaged.

In testimony whereof I affix my signature.

WILLIAM GORDON MILLER.